J. E. WRIGHT.
TELEGRAPH TRANSMITTER.
APPLICATION FILED FEB. 28, 1911.
1,052,548.
Patented Feb. 11, 1913.
9 SHEETS—SHEET 8.
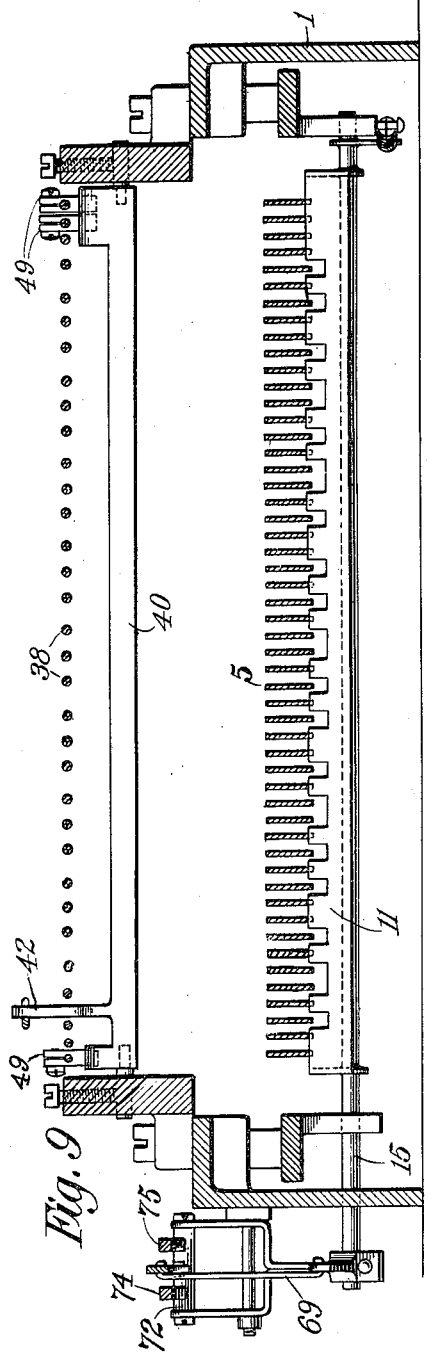
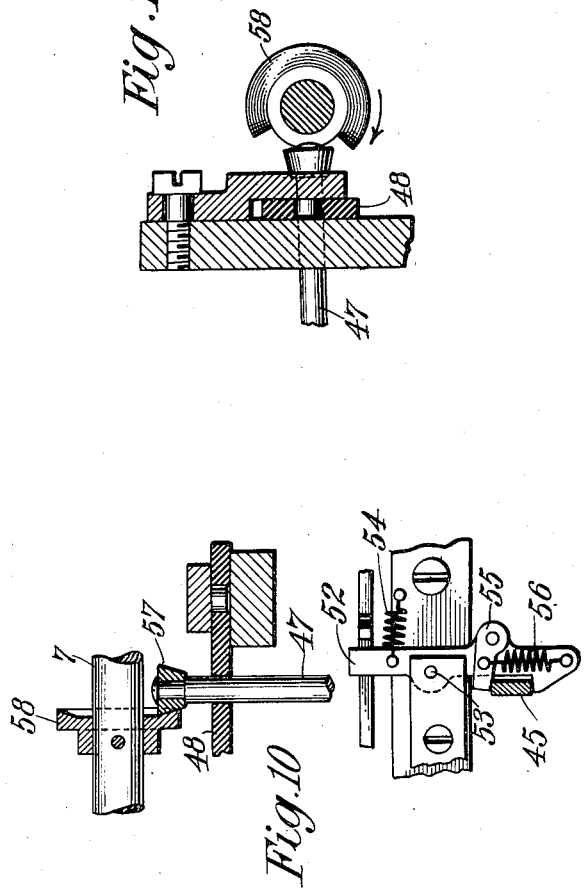
Witnesses:
Raphaël Netter
S. S. Dunham.
John E. Wright, Inventor
By his Attorneys
Kerr Page Cooper & Hayward

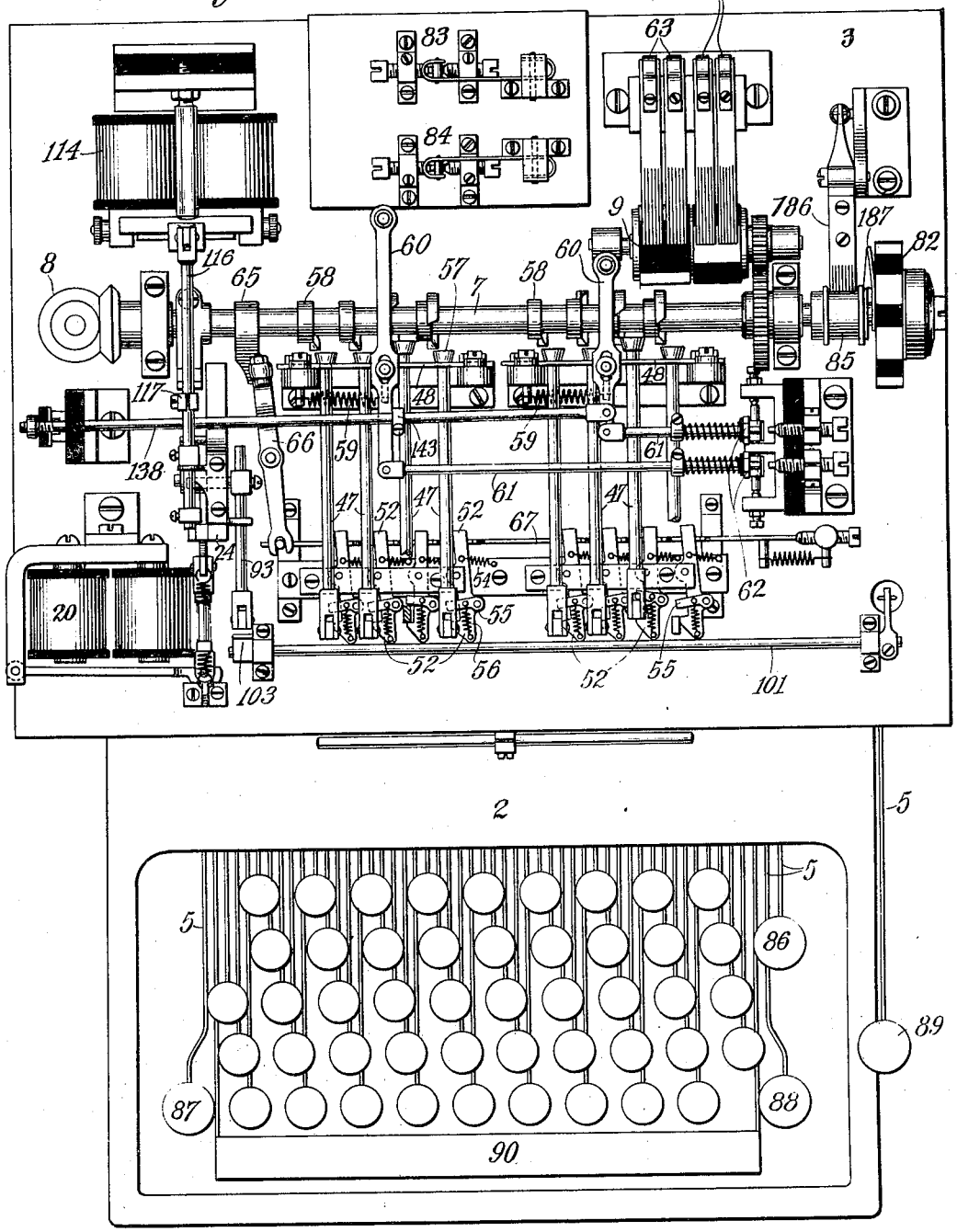

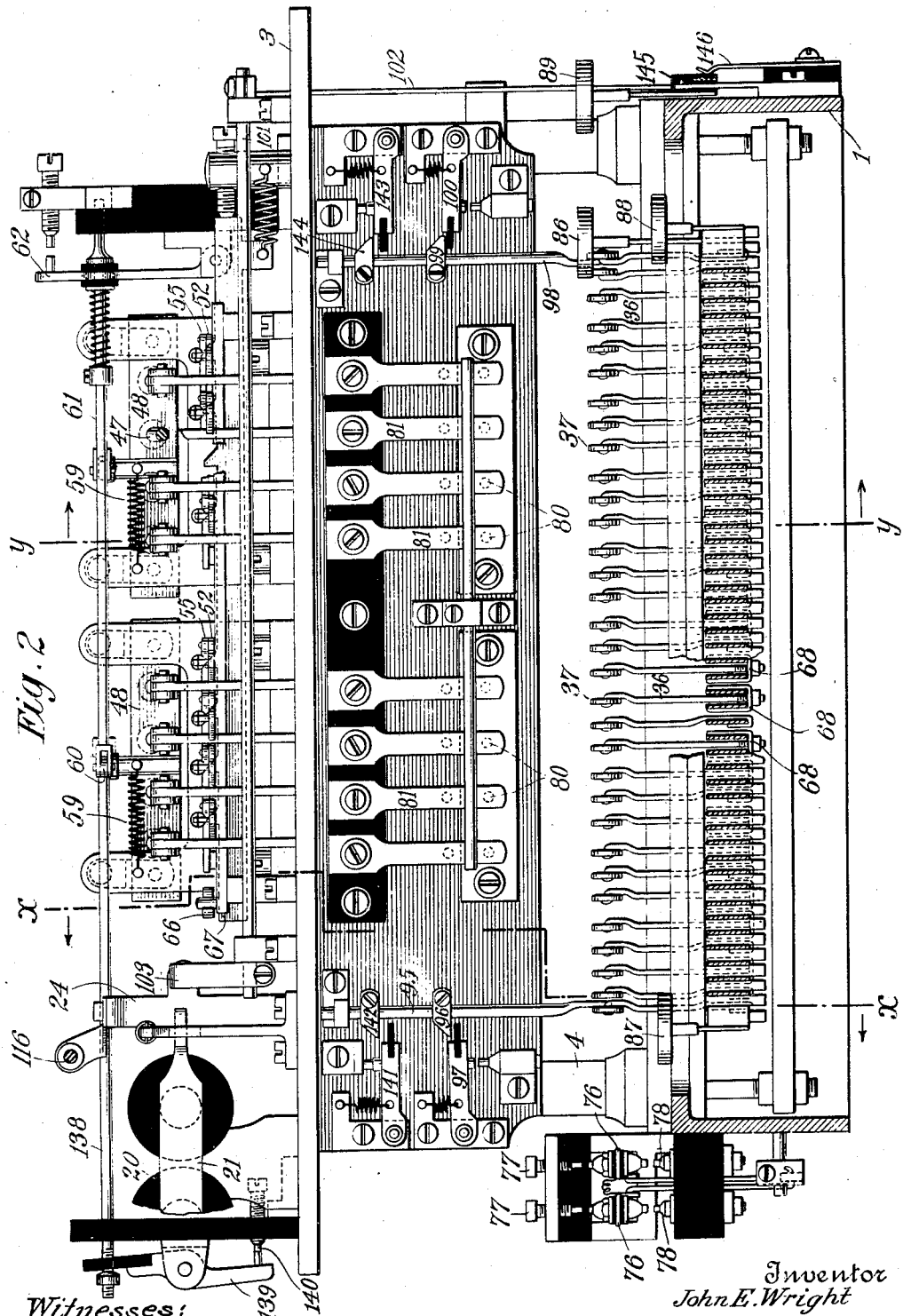

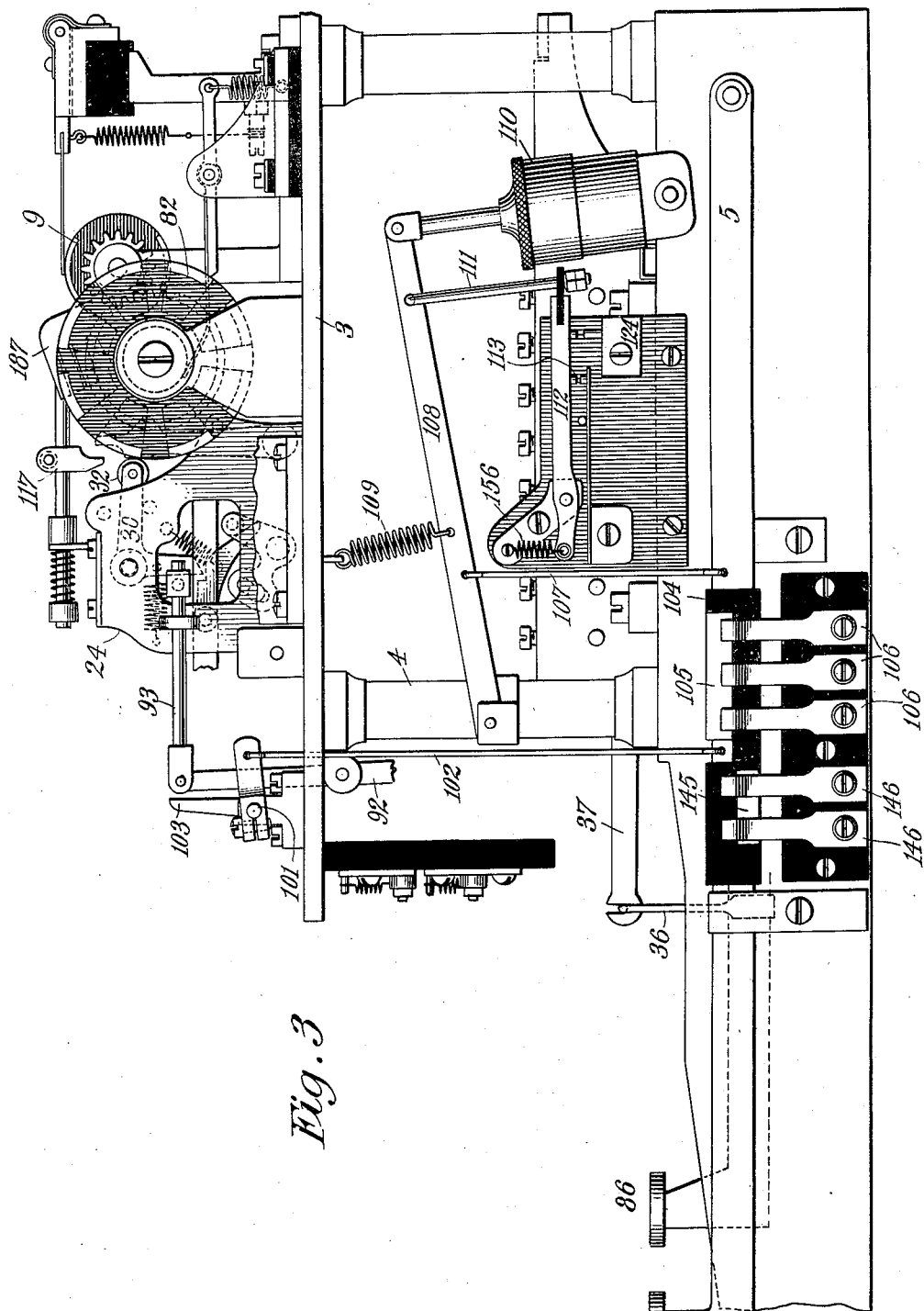

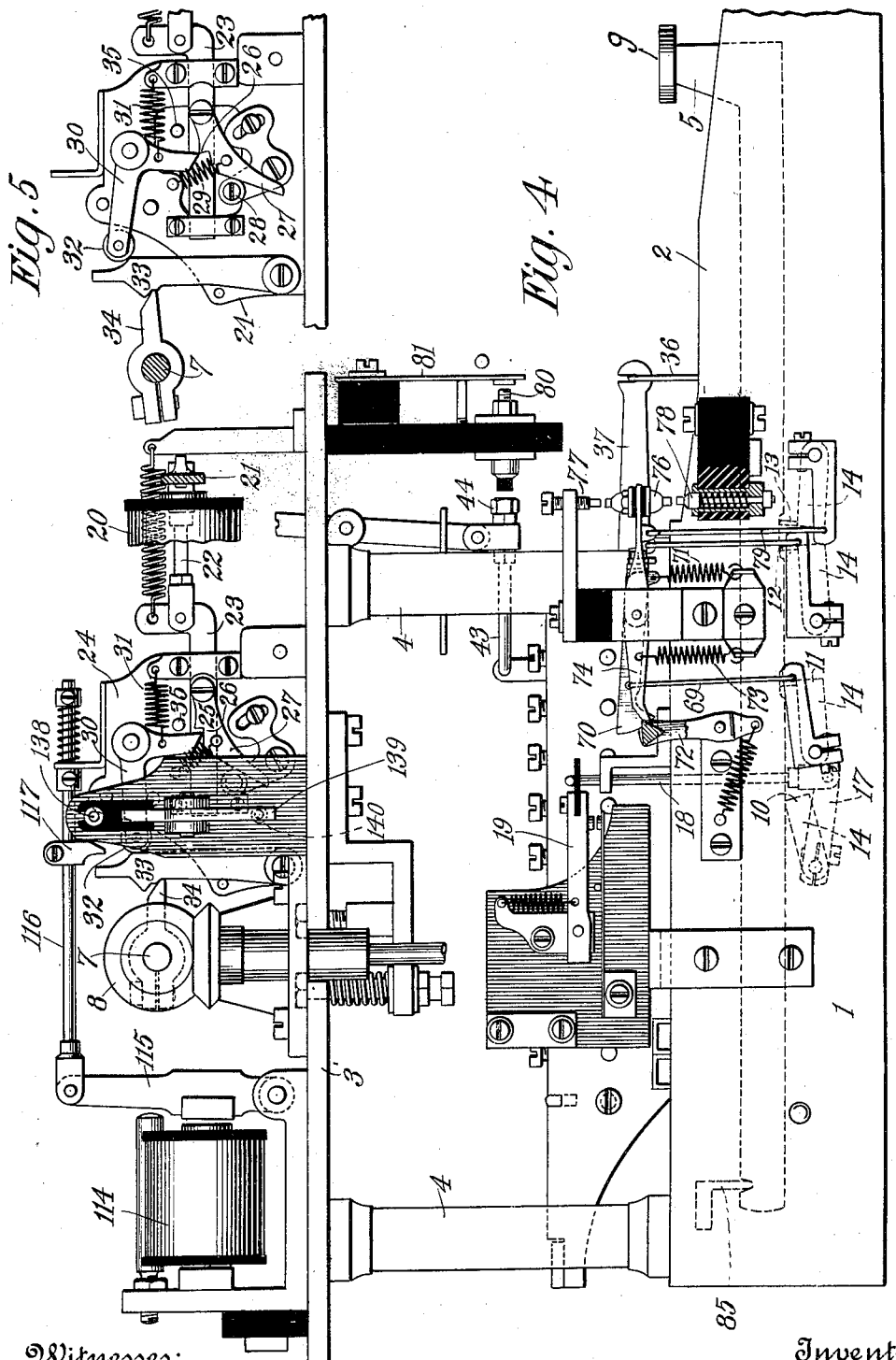

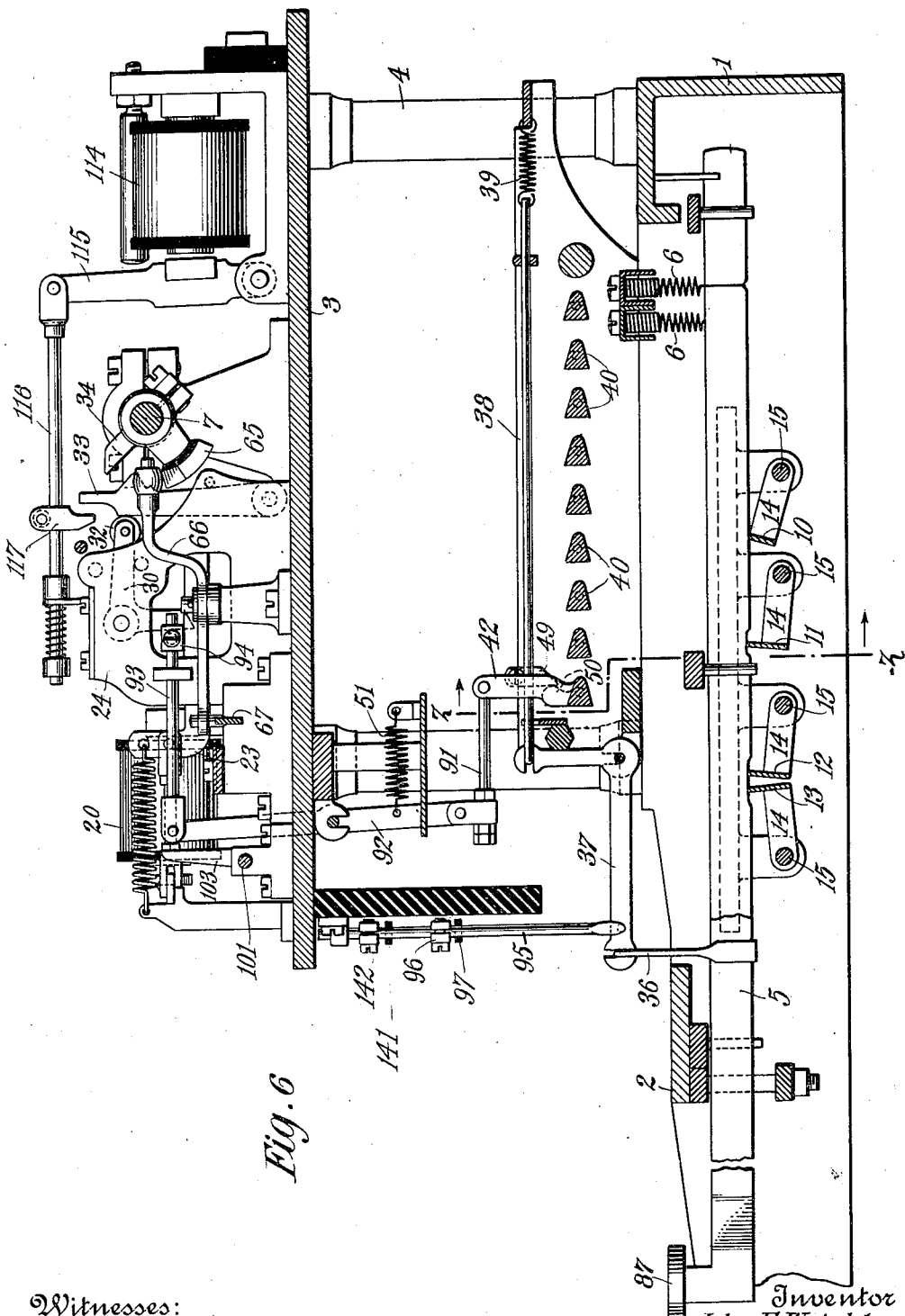

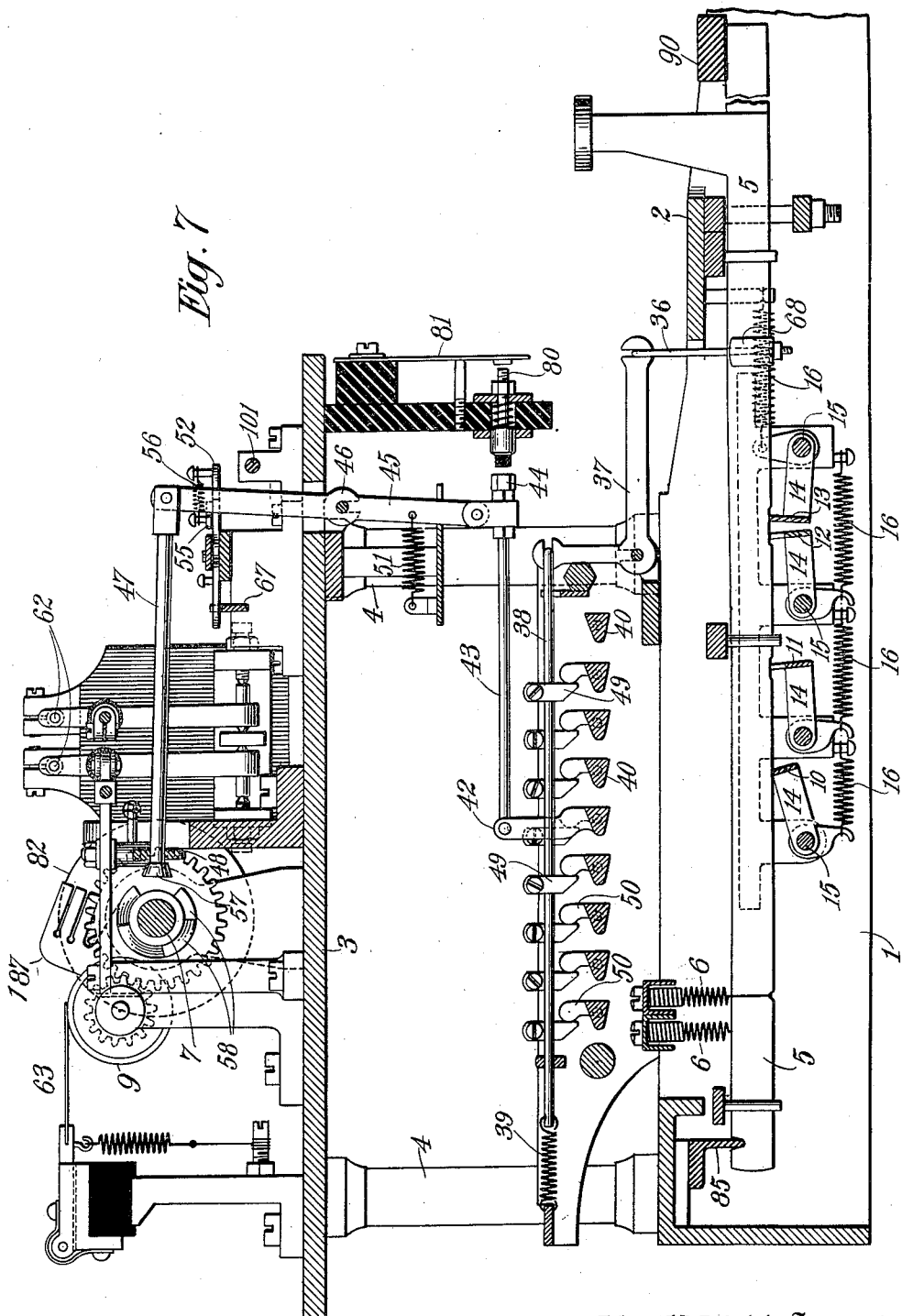

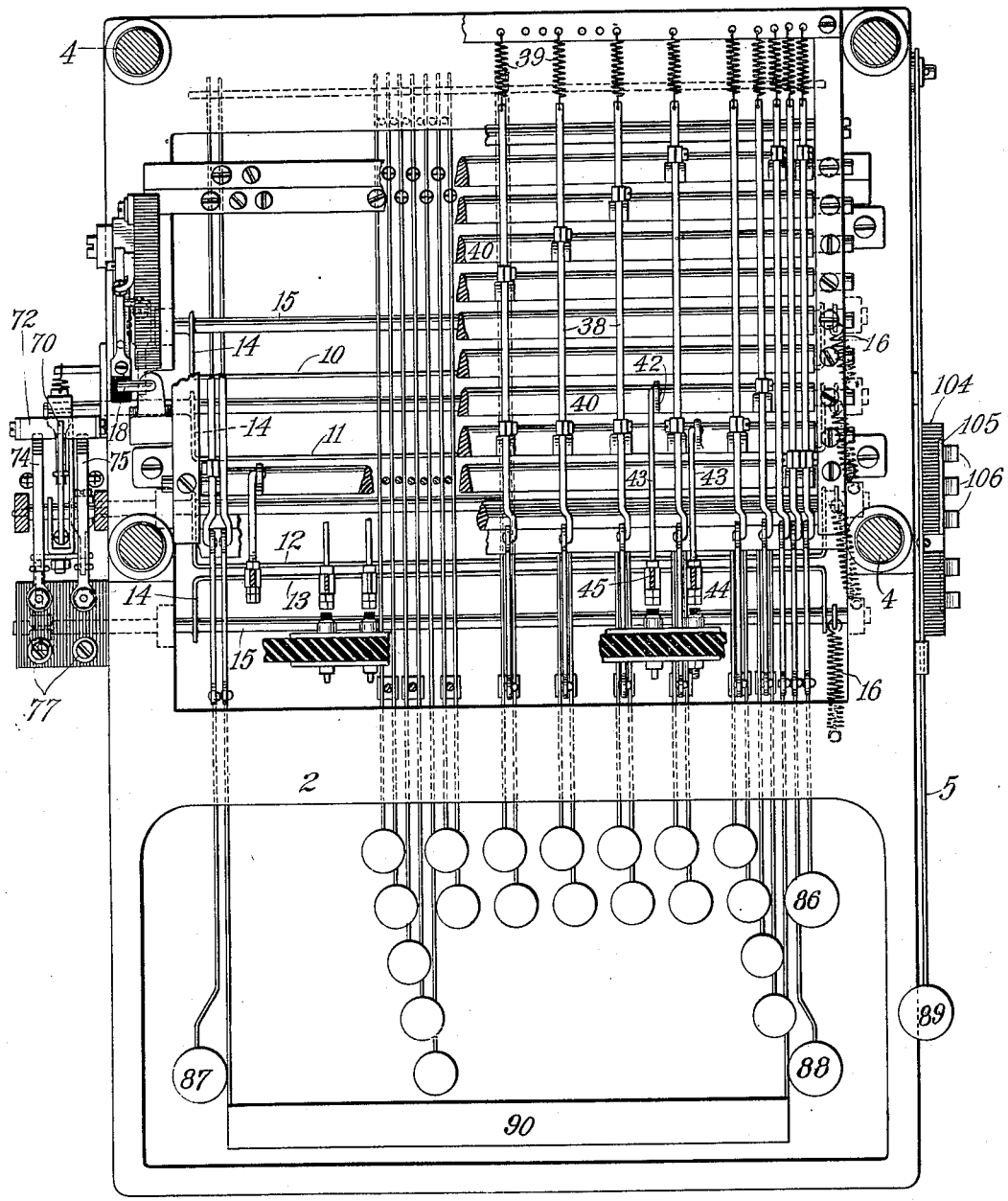

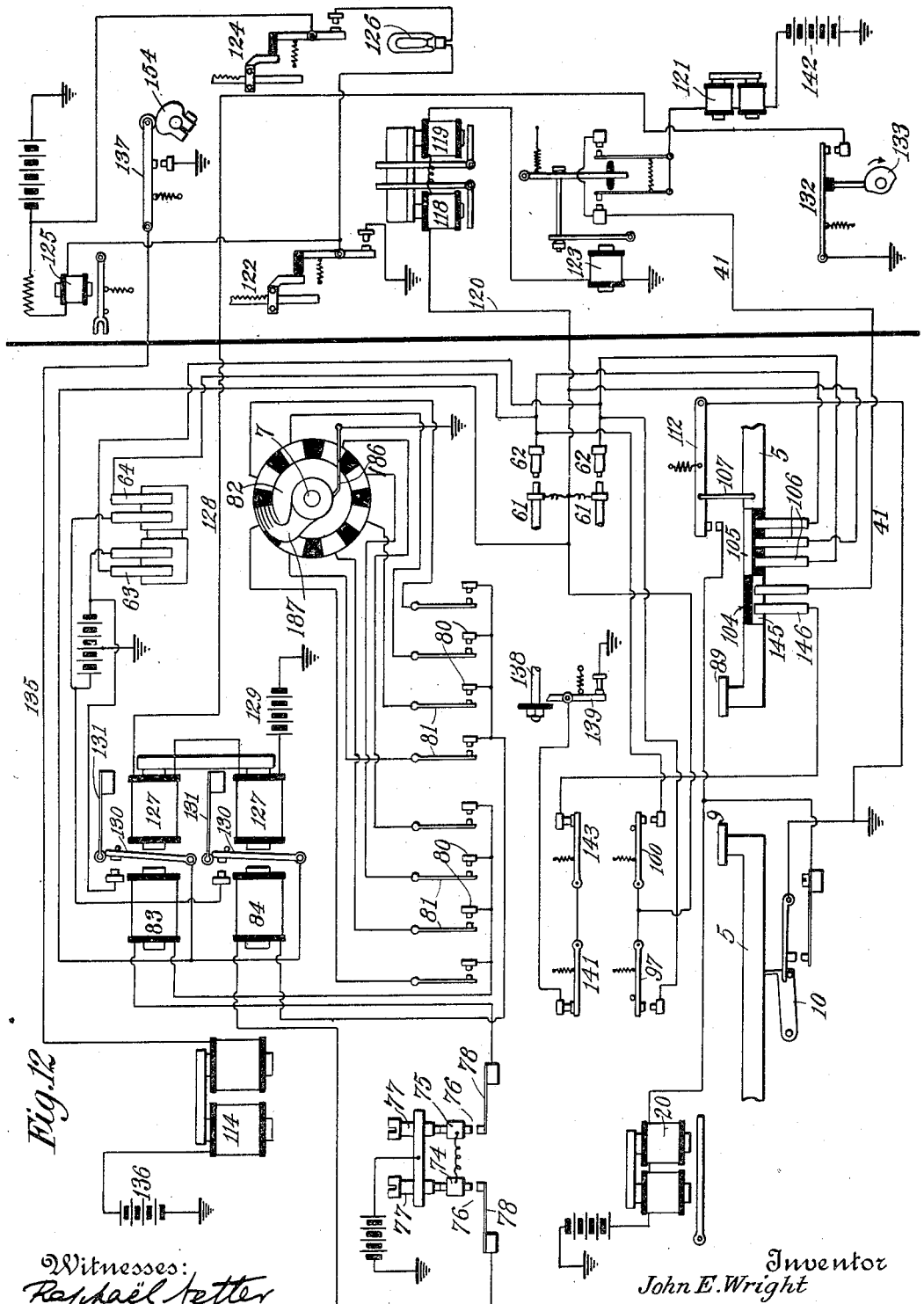

UNITED STATES PATENT OFFICE.

JOHN E. WRIGHT, OF NEW YORK, N. Y.

TELEGRAPH-TRANSMITTER.

1,052,548.

Specification of Letters Patent.

Patented Feb. 11, 1913.

Application filed February 28, 1911. Serial No. 611,435.

*To all whom it may concern:*

Be it known that I, JOHN E. WRIGHT, a citizen of the United States, residing at New York, borough of Manhattan, county and State of New York, have invented certain new and useful Improvements in Telegraph-Transmitters, of which the following is a full, clear, and exact description.

The invention upon which my present application for Letters Patent is based, is an improvement in mechanical telegraph transmitters of the class in which there is employed a bank of keys, by the successive depression or manipulation of which, series of impulses of definite number, direction and order are transmitted over a line to a suitable recorder to effect the selection and impression of the characters corresponding thereto, and such other adjustments and operations of the recorder as may be necessary for its proper working.

More particularly, my improved instrument, aside from its general applicability, and certain distinguishing features of novelty which it embodies, is designed with special reference to the operation of the column or page-printing telegraph instrument which forms the subject of a patent granted to me on April 12, 1910, No. 954,489, and as an aid to an understanding of its nature and purpose the following statement of the more prominent features of the device of that patent will be found apposite.

The type-wheel of the printing instrument or recorder in question, is in the form of a cylinder and contains five parallel rows, each containing ten equally spaced characters or their equivalent blanks. This type-wheel is capable of an intermittent movement around its vertical axis by steps equal to two character spaces, and is designed when thus rotated to bring alternate characters of any row to the printing position. It is also capable of a step-by-step movement in a vertical direction, or in line with its axis, to bring any of the four rows of characters not normally in line with the printing position into alinement therewith, or to lift the last or lowest row of characters one step beyond the printing position.

The type-wheel is intermittently rotated by suitable escapement mechanism responsive to say, positive current impulses, and is lifted by similar mechanism responsive to negative impulses, so that, as in its normal position one of the five rows of characters is in register with the printing position any of the other rows may be brought to such position by not more than four negative impulses. The first three spaces on the row of characters normally in alinement with the printing position are left blank, but when any other row is in register, any of the other alternate characters in such row may be brought to the printing position by not more than four positive impulses. The mechanism for intermittently rotating, and that for intermittently lifting the type-wheel, are non-interfering in their operation, so that the order in which the positive and negative impulses of any given series are sent to line is immaterial, except for the fact that the best practical working conditions require that successive impulses be, as far as possible, in alternately opposite direction.

To print these characters of any row which are intermediate to those normally presented to the printing position by the step-by-step rotation of the type-wheel, the latter is turned by the proper number of positive impulses to bring to such position the character next adjacent to that desired, and by a prolongation of the impulse ending the series, mechanism responsive only to such prolonged impulses, but without regard to their direction, is operated to turn the type-wheel through one character space so as to bring the desired intermediate character into printing position before the impression is made by the printing magnet.

The operation of printing is effected through the instrumentality of special mechanism responsive either to the prolonged final impulse of a series transmitted for the selection of any such intermediate character, or by the prolonged interruption of current following a series of short impulses transmitted for the selection of any character which by the normal intermittent movement of the type-wheel is brought into printing position. As a positive or turning impulse rotates the type-wheel through two character spaces, it is obvious that the first two character spaces of the row normally presented to the printing position cannot be utilized, and these are therefore left blank. Spacing is effected by transmitting a single positive or turning impulse which presents the third character space to the printing position, but as above stated this is also left blank so that although the printing magnet is operated no impression is made, but the type-wheel carriage is advanced one character space. The feed of the paper through the space of a line is effected by the transmission of a series of five positive impulses which bring into play special mechanism designed for that purpose, while the return of the type-wheel carriage to its intitial or starting point in a line is effected by a series of five negative or lifting impulses which raise the type-wheel one step beyond that in which the fifth or lowest row of characters is brought into alinement with the printing position. It may be mentioned here that more than five turning or lifting impulses sent in rapid succession, have no other effect than in the one case to feed the paper, or in the other to return the type-wheel.

From the above general statement of operation it is evident that the maximum number of impulses required for the selection and impression of any character on the type-wheel is eight, four positive and four negative; that the paper sheet may be fed through a line space by five positive impulses; that the type-wheel carriage may be returned to begin a line by five negative impulses, and that in the case of those characters not normally presented to the printing position by the intermittent rotation of the type-wheel, the final impulse of the series necessary for their selection and impression must be prolonged. A further requirement, rendered important by practical considerations, as above stated, is that impulses of opposite direction should alternate with each other as far as possible. It therefore follows that a transmitter to properly operate in such a system should be so organized that the depression of the respective character keys will send to line from one to eight current impulses, and that the direction, order and character of the impulses of each series must be such as to select and print the character corresponding to the key depressed. For such operation the transmitting instrument of this application is organized, and this is a statement in the simplest terms of its most prominent functions. In practice, however, many subsidiary operations are necessary for the accomplishment of the best results, and for the performance of these I have devised certain mechanisms which are applicable, not only to this particular instrument but to others of the same general class. All of these will be readily understood by reference to the drawings and to the detailed description thereof which follows.

Figure 1 is a top plan view of the transmitter complete. Fig. 2 is a front view in elevation, the forward portion of the base and parts of the key levers being shown in section. Fig. 3 is a side elevation of Fig. 1 viewed from the right. Fig. 4 is a similar view viewed from the left, the forward part of the base being cut away in both this and Fig. 3. Fig. 5 is a detail of the mechanism for starting the driving shaft. Fig. 6 is a vertical section on the broken line $x$—$x$ of Fig. 2 viewed from the right. Fig. 7 is a vertical section on the line $y$—$y$ of Fig. 2 viewed from the left. Fig. 8 is a top plan view with the upper part or platform removed. Fig. 9 is a sectional detail through the key levers and a portion of the base on line $z$—$z$ Fig. 6. Figs. 10 and 11 are enlarged details of portions of the character-selecting devices, and Fig. 12 is a diagram of the electrical connections, showing the relations of the various parts of the instrument to each other and to the devices used in the recorder or receiving instrument.

In general mechanical design the instrument resembles an ordinary typewriter, having a cast iron base 1 with a projecting front 2, containing and exposing through an opening in its top a bank of keys similar to those commonly employed in single case machines; a raised platform 3 and columns 4 supporting the same. The key levers 5 contain notches at their rear ends, and are held up by spiral springs 6 against a knife-edge 85 on which they have a pivotal bearing. The main keys correspond to letters, numerals and other characters on the type wheel of the recorder, while certain auxiliary keys are employed for spacing, for returning the type-wheel carriage to its initial position and at the same time feeding the paper one line space, or for feeding the paper without returning the carriage and for other purposes, as will be more fully described hereinafter.

The principal mechanical elements controlled by the operation of the keys are a main shaft 7, receiving power from any suitable prime mover through gearing 8, and the usual frictional or slipping connections with the motor shaft, which latter for the purpose of simplifying the drawings is not shown; a commutator 9 driven by gearing connecting it with the shaft 7, and adapted when in movement to send to line according to the particlular adjustments or conditions determined by the character-selecting devices, positive or negative impulses, or both alternately, and a circuit-controller or "sunflower" 82.

In order to avoid, as far as possible, repetition and still convey a clear understanding of the details of the instrument effective in the normal and necessary operation of the device, the construction of such details will be described in connection with a statement of their purpose and function. Let it be assumed, therefore, that any given key, as 9, Fig. 4, be depressed by the operator for sending to line that particular series of impulses which is required to bring the character on the type-wheel corresponding to said key into printing position and to secure an impression from the same. Without reference, for the moment, to the order of the operations effected by such depression of the key, one result of that movement will be to unlock the main shaft 7 and put the instrument into position for operation. This is accomplished by the following instrumentalities: In the base 1, and extending under the entire series of key levers 5, are four bars 10, 11. 12, and 13, carried by arms 14, rigidly fixed to rock-shafts 15 and held normally up in contact with the key levers by the tension of springs 16, Fig. 7. The bar 10 has a continuous straight edge, and is engaged by all of the key levers and oscillated through a predetermined arc by their depression. When any key, therefore, is depressed (see Figs. 4 and 7) the oscillation of the bar 10 imparts a partial movement of rotation to its rock shaft, and by this means depresses an arm 17, fixed to said shaft and extending horizontally therefrom. This draws down a rod 18 connected to the spring-actuated member 19 of a circuit closer in a local circuit including a magnet 20. Assuming that by this operation the magnet 20 is energized, it will attract toward its cores an armature 21 connected by a pivoted rod 22 with a spring-retracted bar 23 which slides in a frame 24. The bar 23 carries a pivoted latch 25 having a notch or shoulder 26 on its upper side, and a curved extension 27 that bears against a stop 28, against which it is held by a spiral spring 29. Normally, one end of a bell-crank lever 30 pivoted to the plate or frame 24, and retracted by a spring 31, is engaged by the shoulder 26 and lies in the notch formed thereby, thus permitting its other end, which carries a roller 32, to drop by the action of spring 31 into the path of a pivoted vertical lever 33, and to form a rigid stop therefor.

A toe 34 on the main shaft 7 normally engages a beveled shoulder on the lever 33, the rotative tendency of the said shaft 7 imparted by its frictional engagement with a driving motor, operating to force the lever 33 against the stop formed by lever 30. By reason of this engagement the shaft 7 is normally locked or prevented from rotating, but when an impulse of current is directed through the magnet 20 the armature 21 is attracted, and the slide 23 forced forward, which raises the horizontally extending end of the lever 30 to the position shown in Fig. 5. This permits the toe 34 to force back the lever 33, the roller 32 running upward over the cut-away portion of the said lever 33. By this movement, and the continued forward movement of the slide 23, which forces the latch 25 downward, by reason of its engagement with the stop 28, the lever 30 is wholly disengaged from the latch, but as the lever 33 is instantly freed from engagement with the toe 34, by the rotation of shaft 7, the lever 30 under the force of the spring 31, and until it reaches its normal position in contact with a stop 35 and again becomes a rigid stop for lever 33, forces that lever forward and blocks the toe 34, thus limiting the movement of shaft 7 to one revolution. As soon as the circuit through magnet 20 is interrupted, as it will be by the release of the key, the depression of which closes it, slide 23 is retracted and the latch 25 drawn backward under the end of lever 30 until it resumes the relation to that lever which is shown in Fig. 4. Thus whenever a key is depressed to print a character, one effect of such depression is to release the main shaft and permit it to make one complete revolution.

Another result accomplished by the depression of any character key is the selection and adjustment for effective operation of the devices which determine the number, direction and order of the impulses of the series which must be sent over the line to select and print the character corresponding to such key. These devices and their mode of operation will be now described.

When any key is depressed, its corresponding lever 5, Fig. 7, draws downward the forward end of the horizontal arm of one of a series of bell-crank levers 37 with which it is connected by a tie-rod 36. The vertical arm of each of these bell-crank levers is connected with one end of a bar 38, the rear end of which is connected with the frame of the instrument by a spiral spring 39. Immediately under the bars or rods 38, and at right angles thereto, are nine horizontal rocking bars 40 pivotally mounted in the sides of the frame, as shown in Figs. 7 and 8. Each of the bars 40 is provided with a vertical stud or arm 42, eight of which are connected by rods 43 to heads 44 pivotally suspended from the lower ends of levers 45, pivoted to the frame of the instrument at 46 and extending upward through slots in the platform 3. The upper ends of these eight levers 45 are pivotally connected to the ends of a corresponding number of plungers 47, the rear ends of which pass through openings in and are supported by two plates 48, each mounted in suitable guides with the capability of a limited endwise or lateral movement therein. Four of the plungers 47 pass through perforations in and are thus supported in a horizontal position by one of the plates 48, and four by the other.

On the horizontal rods 38 stops 49 are secured which lie in the path of studs 50 extending upwardly from the rocking bars 40, so that when a given key lever is depressed, and the rod 38 connected therewith is drawn forward, the stops 49 on that rod engage the studs 50 lying in their path and turn through a certain arc that bar, or those two bars 40 from which the stud or studs project. By this partial rotation the arms 42 extending from the rods 40 force forward the rods 43 and swing the levers 45 connected therewith, about their pivots 46 against the tension of spiral springs 51, and thereby force the corresponding plungers 47 backward or toward the main shaft 7. As soon as they reach their limit of rearward movement the plungers 47 are locked by the mechanism shown in Fig. 7, and in enlarged detail in the lower part of Fig. 10. This locking mechanism, which is provided for each plunger 47, comprises a bar or plate 52 pivoted at 53 to a rigid part of the frame and connected therewith by a spiral spring 54. The forward end of each plate 52 is formed with a shoulder constituting in effect a hook, and carries a short lever 55 pivoted at one end and drawn toward the forward end of plate 52 by a spiral spring 56. Normally, as shown in Fig. 1, the heads or wider portions of plates 52 bear against the right hand side of the adjacent levers 45, but when the upper end of any one of these levers is forced backward it lifts the latch or short pivoted lever 55 and permits the plate 52 to swing over toward the left bringing its shoulder in front of lever 45, thus locking the latter in its backward position. If the plate 52 be turned to the right sufficiently to release the lever 45, the engagement of the two cannot be reëstablished until the said lever 45 has completed its full forward movement so as to be in a position to reëngage the end of lever 55 from the front or side toward the hooked end of plate 52. The purpose of this construction will be explained below.

The free ends of the plungers 47 carry anti-friction rollers 57 which are in the form of frusta of cones, with which cams 58 on the main shaft 7 are adapted to come into engagement when the plungers are forced back toward the axis of said shaft. These cams cover arcs of varying length around the shaft, and each on coming in contact with its appropriate plunger head 57, forces the plunger toward the right and retains it in its backward position and maintains it in its deflected position for an interval dependent upon the length or extent of the arc covered by the cam. As each plunger passes through a perforation in one of the plates 48, the engagement of any cam and plunger forces the plate supporting such plunger toward the right against the tension of a spiral spring 59.

Above each plate 48 is a horizontal lever 60 pivoted at one end to the frame and connected at the other to a spring-actuated plunger rod 61, each of which rods controls an electric circuit breaker or contact lever 62, these parts being so arranged that whenever a plunger 47 is forced backward and locked, it will be engaged and deflected to the right by its appropriate cam on the shaft 7 for a given interval, during which the corresponding circuit controller 62 will remain closed.

The two contact levers 62 control two circuits or paths to line from the respective terminals of the main battery or source of current through the commutator 9, which latter is composed of two rings or series of alternately disposed or staggered conducting and insulating segments, upon each of which series bear two contact brushes 63 and 64. When brushes 63 are on a metal segment a current, say positive in direction, is sent to line, and when brushes 64 are on a metal segment a negative current impulse will be transmitted, hence if the proper circuit connections are made, the rotation of the shaft 7 and consequent rotation of the commutator will send alternate positive and negative impulses of short duration to and over the line. The intervals during which the circuits are closed to thus permit the impulses in either direction to pass to line, are determined by the duration of closure of the contacts 62, and this in turn by the circumferential extent of the cams 58 and the periods during which these latter maintain the plungers 47 in a backward and deflected position. Hence if a given character to be printed requires a series of four impulses, two to turn and two to lift the type-wheel of the recorder, the key which corresponds to that particular character will when depressed, select, in the manner which will now be understood, and force back that plunger of the left-hand group of four which is retained and deflected by its cam for an interval of sufficient duration to permit two positive impulses to be transmitted by the commutator, and also that plunger 47 of the other or right-hand group of four, which will in like manner permit two negative impulses to go to line, and it is obvious that since the impulses are transmitted alternately that this will result in the sending of four current impulses in alternately opposite directions.

Just after the shaft 7 has started in rotation and the engagement between one or two of its cams with the selected plunger or plungers 47 has been established, a special cam 65 on the shaft engages and deflects a lever 66 operating to shift a sliding bar 67 with properly placed projections or studs thereon to engage with the pivoted plates 52 and disengage them from the plungers 47 leaving all of them in normal position and ready to lock any plunger forced back from its normal position by a key for establishing the combination necessary for the next character.

In the above description of structure and operation the use of short impulses only for the working of the system has been presupposed. But, as has been explained the recorder with which the particular transmitter under consideration is used, is one having a type-wheel adapted to be raised step-by-step by short negative impulses, and rotated step-by-step by short positive impulses, not to present every character of any row to the printing position, but every other character. The intermediate characters are brought to printing position by a prolongation of the final impulse of a series, or that which brings into position the character next adjacent to that intermediate character which it is desired to print, such prolongation operating to shift the type-wheel forward or backward through the space of one character just prior to the operation of printing. One of three things is, therefore, liable to occur in the selection and printing of any given character. It may be brought to position by one or more short impulses, and the printing effected by a prolongation of the interval of no current between that series of impulses and the next, or, when these operations require the prolongation of the final impulse, this latter may be either positive or negative. It follows, therefore, that the depression of a key must determine in advance whether the impulses transmitted for selecting and printing the corresponding character shall be positive, or negative, or alternately positive and negative, or whether the impulses shall be all short, or all short but the final impulse, and in all cases, the order of the impulses. From this it will be observed that the actuation of a lever 37 which adjusts the selecting devices to send a given series of short impulses, say, two positive and two negative, and thereby select and print one character, may also be utilized to select and print another character if suitable provision be made for the prolongation of the final impulse. This enables me to utilize one lever 37 for two key levers 5, and thus to greatly simplify the instrument. The arrangement of parts for the accomplishment of this result, and their mode of operation are as follows:—

Each link or rod 36 depending from the forward end of a bell-crank lever 37 carries at its lower end an inverted yoke 68 (Fig. 2) through which, with the exceptions hereinafter noted, pass two adjacent key levers 5, so that each lever 37 will be actuated by the depression of either of said two key levers. It has been explained that all of the latter engage with and oscillate the cross-bar 10 (Fig. 7) for the purpose of releasing the main shaft 7, and it may now be explained that each key lever 5 in addition to oscillating the bar 10, also engages and depresses one of three other similar bars 11, 12, or 13. Which one of the latter is thus engaged by the depression of any lever 5 is determined by providing, as shown in Fig. 9, notches in these bars along their upper edges which lie immediately under the levers 5, the said notches being so disposed that the proper bar only will be engaged, while the bars which are not to be brought into operation permit the levers above them to move downward into a notch. The depression of a given key, therefore, oscillates or depresses the bar 10 and, say, bar 11. This latter bar is connected by a tie-rod 69 with the long arm of a pivoted lever 70, the opposite end of which is connected to the frame by a spiral spring 71. The longer or free end of the lever 70 has a rounded surface and operates when depressed by the movement of bar 11 to force over toward the left a pivoted spring-actuated detent 72, and to thereby release and permit to drop in response to the tension of spiral springs 73, two levers 74 and 75 carrying contacts 76 arranged to vibrate between fixed terminals 77 and spring-seated contact terminals 78. The two contacts 76 are electrically connected together, it may be here mentioned, for the purpose hereinafter explained. When, by the depression of lever 70 the detent 72 has been forced backward, and the levers 74 and 75 released from engagement with its upper surface, the latter levers remain in lowered position and in engagement with the inclined or beveled under surface of said detent, while the contacts 76 are held firmly against their upper stops 77. Without tracing at this point the electrical connections thus established, it is sufficient to say that as long as the parts remain in these relations, short impulses of current only will be transmitted to line. A key therefore that operates to depress the bar 11 and effect the above described adjustments, corresponds to a character which requires for its selection and printing short impulses only, either positive or negative, or both.

Assume now that some other key is depressed that engages with and oscillates bars 10 and 13 without moving the other two bars 11 and 12. The said bar 13 is connected by a tie-rod 79 with the forward end of lever 74, and when the said bar 13 is lowered it acts to raise the free end of lever 74, and thereby pushes back the detent 72 until the end of the lever 74 slips over and engages with the top of the detent by which it is retained in its raised position. By this movement of lever 74 the contact 76 which it carries is withdrawn from the upper contact stop 77, and is brought and maintained in engagement with the lower spring-seated contact 78. By this means circuit connections are established by which the final and say negative impulse of the series which the depressed key is adapted to transmit, will be prolonged, this operation being effected by the following instrumentalities: When the key, now under consideration, is depressed, and through its mechanical connections therewith, the rod or plunger 43 forced forward, a spring-actuated contact plug 80 is engaged by the plunger and forced against a spring contact 81. There are eight of these contacts 81 as shown in Fig. 2, one for each of the eight plungers 47 and levers 45, and each spring 81 is electrically connected with one of the eight metallic segments of a stationary sunflower disk 82 (Fig. 1). The contacts 80, corresponding to the four plungers 47 in the left-hand or turning group of four, are connected by a common conductor through the magnets of a relay 83, shown in detail in Fig. 12, to the stop 78 under lever 75, while the corresponding contacts 80 of the right-hand or lifting group of plungers 47 are similarly connected through another relay 84 with the stop 78 under lever 74.

On the main shaft 7 is a contact ring 85 connected to earth through a brush 186, and in electrical contact with said ring 85 is a wiper or brush 187 revolving with the shaft 7 and sweeping over alternate insulating and conducting segments of the sunflower 82, and these parts are so proportioned and related to the segments of the commutator 9, which latter rotates at twice the speed of the wiper 187, that the said wiper passes onto a metallic segment of the sunflower just as the brushes 63 or 64 leave a metallic segment of the commutator. The relay 83 controls a circuit or path from one pole of the battery to line, and relay 84 similarly controls a circuit or path between the other pole of the battery to line, or what in both cases is a path for current the completion of which is equivalent to establishing a direct electrical connection around brushes 63 or 64 to line respectively.

From the arrangement and relations above described, it results that just as a pair of brushes that is sending the last impulse of the series selected by the key depressed leaves the metal segment of the commutator, the wiper 187 comes onto that metallic segment of the sunflower which is connected with the contact 80 corresponding to and engaged by the head 44 that operates that one of the plungers 47 which has been selected by the key to permit the sending of the final impulse of the series, which for purposes of illustration may be assumed to be a negative impulse. There is thus completed through that sunflower segment and the wiper to ground, the circuit from lever 74, the contact stop 78 under said lever, the relay 84, the contact 80 corresponding to the selected plunger 47 and the spring 81.

The relay 84 being thus energized closes what is equivalent to a circuit around brushes 64 to line which has the same effect as increasing the width of the metallic commutator segment and prolonging the final impulse of current sent to line. The armatures 130 of the relays 83 and 84, (see Fig. 12), are normally retracted and in position to interrupt the by-pass circuits to line, but when attracted by the relays they are held in engagement with their contact stops by means of spring tongues 131, carrying projections over which the ends of the armatures are drawn. By suitable means, hereinafter described, the armatures 130 are retracted to break these circuits as soon as the printing magnet of the sender has operated. To illustrate this operation by a specific example. Assume that a letter is to be printed which requires a series of two positive and two negative impulses, and that the letter is one occupying an intermediate position on the type-wheel that requires the final impulse to be prolonged in order that the type-wheel may be shifted forward or backward one character space before the impression is made. The key for that letter will, by means of the selecting devices above described, force back one of the turning plungers 47, that is to say, one of the left-hand group of plungers that control the transmission of the impulses operating to rotate the type-wheel of the recorder and that will permit two positive impulses to go to line, and will also force back one of the other group of lifting plungers that will permit two negative impulses to be transmitted. The same key will operate to depress lever 74 and also operate to close the contacts 80 and 81 of the two plungers 47 which are selected, and start the shaft 7 in rotation. The lever 74 is selected and operated because the impulses for the desired character are assumed to go to line in the order—positive, negative, positive, negative, and because the final impulse is a lifting current which is sent to line after the circuit closing rod 61 of the left-hand group of plungers 47 (Fig. 1) has been retracted. On the other hand, if a series of three positive and two negative impulses is necessary for printing an intermediate character, or one which requires a prolongation of the final impulse, which in this case we may assume to be positive, the key for sending this series of impulses will engage with bar 12, the depression of which actuates lever 75, which releases lever 74 from engagement with detent 72, if such engagement exists, and connects up through its own contact 76, and the stop 78 under it, one of the plunger contacts 80, 81 of the left-hand group. This results in a prolongation of the final impulse sent through the contacts closed by rod 61 of the left-hand group of plungers 47 after the other rod 61 has been retracted.

Summarizing, therefore, the operations described above in detail, it may be stated that the depression of any character key by engagement with a cross-bar 10 releases the main shaft 7 and allows the latter to make one complete revolution. The key lever depressed also oscillates one of the rocking or cross-bars 11, 12 or 13 with the result that both contacts 76 are brought and maintained in engagement with their upper stops 77 so that short impulses of current only are sent to line; or that one contact 76 is brought into engagement with its lower stop 78 so that a final negative impulse is prolonged, or that the other contact 76 is brought and maintained against its stop 78, while the first is left in or returned to engagement with its upper stop so that a final positive impulse will be prolonged. The depression of a key also operates through the mechanical connections heretofore described to force back one of the plungers 47 of the right-hand group of four, or one of the left-hand group of four, or one of each group, which determines the number of impulses and the direction of the impulses of any series that may be transmitted. The order in which the several operations above described are performed, is in some respects immaterial, but for obvious practical reasons it is desirable that the adjustment of the selecting devices should precede the release of the shaft 7, and that the establishment of the proper circuit connections for the transmission of any given series of impulses should instantly follow the adjustment of the selecting devices.

In addition to those keys which control the transmission of impulses for selecting and printing the several characters on the type-wheel of the recorder, other keys are employed for feeding the paper, returning the type-wheel carriage to begin a line, for spacing and other purposes. These working keys are five in number and are designated by the numerals 86, 87, 88, 89 and 90. The rapid spacing key 86 controls the forward feed of the type-wheel carriage which is advanced one character space for each operation of the printing magnet, or once for each revolution of the main shaft 7, which latter by the depression of key 86 is started in rotation and permitted to revolve continuously as long as the key is held down, as will be explained more in detail.

The key 87 controls the feed of the paper sheet in the recorder, and advances it one line space as the result of the operation of special mechanism in the recorder brought about by the transmission over the line of a series of five positive or turning impulses.

The key 88 when depressed causes the type-wheel carriage to return to its initial position to begin a line from any point in its travel, and feeds the paper one line space.

The key 89 when depressed returns the type-wheel carriage from any point in the line, feeds the paper and gives a signal, as by lighting an electric lamp, to direct the attention of the operator in charge of the recorder to the completion of a message and the necessity of inserting a blank to receive the next message.

The spacing bar 90, which differs from the other keys only in being of greater length, and in the fact that it is supported by two levers 5 instead of one, feeds the type-wheel forward by steps each equal to one character space, but it differs in its operation from the rapid spacing key 86 in that the carriage is advanced but one step by each depression of the bar without regard to the length of the interval of depression. The operations outlined above are performed by the respective keys under consideration in the manner set forth below.

*The space bar 90.*—When this bar is depressed, as for example for spacing between words, its two levers 5 oscillate the bar 10 to release the shaft 7, oscillate bar 11 which permits short impulses only to go to line and forces back, by means of the mechanical connections hereinbefore described, the first plunger on the left of the left-hand or turning group of plungers 47, which for one revolution of the shaft 7 permits but a single short positive impulse to flow to line. The third character space in the top row of the type-wheel of the recorder, or that row which is normally in alinement with the printing position, is left blank, as has been explained above, so that a single positive or turning impulse set to line will not present any character to the printing position, but will operate the printing mechanism, which results in a feed movement of the type-wheel carriage forward through one character space. Whenever, therefore, the bar 90 is depressed, one short positive impulse is transmitted, the type-wheel carriage fed forward one step without printing a character, but, as in those cases where characters are printed, the main shaft 7 of the transmitter is locked after making one revolution, the printing magnet of the recorder is operated by the prolongation of the interval of no current, and the type-wheel restored to its normal initial position.

*The paper feed key 87.*—The lever 5 of this key in like manner engages and oscillates the two bars 10 and 11 and for the same purpose, but it also by drawing forward a bar 38, to which it is connected by a bell-crank lever 37, (Fig. 6) rocks a special or ninth bar 40 having no corresponding plunger 47, but which by means of a rod 91 connecting its vertical arm 42 with a lever 92, similar to the levers 45 hereinbefore described, advances a sliding bar 93 carrying a stud or projection 94 that engages with and forces toward the shaft 7 the vertical arm of the bell-crank lever 30, thus releasing the shaft 7 and allowing it to rotate as long as the key 87 is depressed. To the bell-crank lever 37, which is actuated by this key there is pivotally connected a vertically sliding bar 95, Figs. 2 and 6, carrying a stud 96, which when the key is depressed engages with a circuit-controlling lever 97 and closes a circuit which constitutes a path parallel to that closed by the movement of the rod 61 when the latter is shifted by the plate 48 supporting the left-hand or turning group of plungers 47, and maintains such circuit closed as long as the key 87 is held down. From this it results that while the said key 87 is depressed the shaft 7 rotates freely and the commutator continues to send short positive or turning impulses to line. The commutator has two conducting and two insulating segments in each series and revolves at twice the speed of the shaft 7. If therefore the key 87 is depressed for an interval greater than that which permits the shaft 7 to make a complete revolution, five short positive impulses will be transmitted, and such a series of impulses will, as has been stated, operate through special mechanism in the recorder to feed the paper one line space. More than five impulses may thus be sent, the additional impulses having no effect, but when the key is raised the prolonged interval of no current brings into play the devices that feed the paper.

*The rapid spacing key 86.*—By the depression of this key its lever 5 oscillates bars 10 and 11 to release the shaft 7 and adjust the instrument to send short impulses only. It also draws down a bell-crank lever 37, Fig. 3, which rotates two of the bars 40, one to force back the first of the left-hand or turning plungers 47, the other to operate, through lever 92, the bar 93 to allow the shaft 7 to rotate freely as long as the key is depressed. By this means the type-wheel carriage will be advanced one step during each revolution of the main shaft 7 because that plunger 47 which normally permits one turning impulse to be sent to line for each complete revolution of the shaft, being held in its backward position by the continued depression of the key 86, will be deflected by its appropriate cam on shaft 7 for an interval during each revolution of the latter sufficient only to permit a single positive impulse to go to line, which impulse being followed by a prolonged period of no current, operates the printing magnet, but without printing any character, as the single turning impulse brings a blank on the type-wheel to the printing position. This advances the type-wheel one step, but after each operation of the printing magnet which is accompanied by such advance, the type-wheel is restored to its normal position. It follows, therefore, that while the key 86 is depressed the main shaft 7 will rotate continuously, sending to line a single positive impulse for each revolution and feeding the type-wheel carriage forward one step by each of such impulses.

*The type-wheel carriage returning key 88.*—It has been explained that the key 87 feeds the paper one line space each time it is depressed without returning the type-wheel carriage to its initial position to begin a line. The key 87 therefore, is used for paragraphing, or when a signature following a message is to be printed, but when it is desired to begin a new line the type-wheel carriage must not only be returned, but the paper fed one line space at the same time. These operations are effected by the key 88 which through the instrumentality of a bell-crank lever 37, draws forward a rod 38, rocks the ninth or front bar 40 and thereby operates the bar 93 that permits the main shaft 7 to rotate freely as long as the key is depressed. It also by drawing down a rod 98 brings a stop 99 thereon into engagement with a circuit-controller 100 that completes a path parallel with that closed by the rod 61 which is operated by the right-hand or lifting group of plungers 47. It results from this, as will now be understood, that as long as the key 88 is depressed, short negative impulses will be sent to line by the continued rotation of the commutator, and that when five or more of such impulses have been thus transmitted and the key 88 released, the type-wheel carriage will be returned to begin a line and the paper fed one line space, as such a series of negative impulses operates through suitable mechanism in the recorder to effect this result.

*The blanking key 89.*—This key is used when a message has been completed for the purpose of restoring the type-wheel carriage to begin a new line, feeding the paper and giving a signal of some kind to call the attention of the operator at the receiving station to the necessity of inserting a blank for the next message. These operations are effected by sending to line a series of five or more positive alternating with five or more negative current impulses, and at the same time bringing into play certain mechanism which prevents the sending of further impulses until a certain predetermined interval of time has elapsed. These means are illustrated mainly in Fig. 3.

To the lever 5 of the blanking key 89 a rock-shaft 101, Fig. 1, is connected by a rod 102 so that when the key is depressed, a projection 103 on the rock-shaft 101 forces forward the bar 93 to release shaft 7 and permit it to rotate as long as key 89 is depressed. The lever 5 of said key carries an insulating plate 104 with a metal plate 105 inserted therein, and when the lever is depressed three spring contacts 106 which normally bear on the insulation, slide onto the metal insert. This has the same effect as closing both contacts 62 which are operated by the rods 61, or in other words it permits both positive and negative impulses of current to flow to line alternately as long as the key 89 is held down. The lever 5 of the key 89 is also connected by a rod 107 with a lever 108, and when the key is depressed the last named lever is drawn down against the force of a spiral spring 109. To the free end of lever 108 is pivoted the piston of a dash pot 110 which is arranged to permit the lever to descend freely, but to retard its upward movement or return. A circuit-controlling lever 112 pivotally supported on an insulating plate secured to the frame of the instrument is normally acted upon by the tension of a spring 156 with a tendency to swing downward, but is prevented from so doing by the enlarged head of a rod 111 pivoted to lever 108 and passing freely through an insulating extension of lever 112. When, however, the lever 108 is drawn down, the lever 112 is free to descend against a stop 124 and close contacts 113 controlling a circuit that includes the shaft releasing or trigger magnet 20, so that when the lever 89 is depressed the shaft 7 is mechanically released and the circuit through the magnet 20 is closed by the engagement of contacts 113. When these conditions have been established the release of key 89 after the proper number of impulses have been transmitted, interrupts the circuit through contacts 106, but the trigger magnet 20 remains energized until the lever 108, under the influence of the spring 109 and acting against the resistance of the dash pot 110, has raised the lever 112 and broken the circuit between the contacts 113. In other words, for a definite interval after the depression and release of key 89 the operation of the transmitter is suspended in order that the attendant at the receiving station may have an opportunity to prepare the recorder for the receipt of the next message by the insertion of a blank.

It may frequently happen that a key for printing a character is depressed before the completion of the cycle of operations attendant upon the selection and printing of the preceding character, and before all of the mechanisms are restored to normal position. To avoid the interference which would otherwise result from sending one series of impulses before that preceding it had fully accomplished its work, a storing mechanism is used which comprises a magnet 114, and an armature 115 therefor pivotally connected with a sliding bar 116, carrying a stop 117 lying in the path of the lever 33, Fig. 4. While the magnet 114 is energized the lever 33 is held by the stop 117 and acts to lock the shaft 7 against rotation without regard to the position of the lever 30. These elements coöperate with the latches or locking levers 52 (see Figs. 1 and 10) in the following manner: When a key is depressed one or more of the plungers 47 is forced back and locked by engagement with its adjacent latch lever 52. A plunger thus locked is retained in that position until released by the cam 65 operating on the lever 66, which operation takes place during the early part of the interval of rotation of shaft 7 after the latter is released from engagement with lever 33. If therefore a key is depressed during the latter part of the rotation of the shaft its corresponding plunger or plungers 47 remain locked until after the shaft 7 begins its next revolution.

The magnet 114 is in a circuit controlled by mechanism in the recorder which maintains such circuit closed and the magnet energized through the latter portion of the periods during which the characters are selected and printed, or more specifically during the intervals of the operations of the printing magnet and the return of the type-wheel to its initial or normal position. The main shaft 7 therefore is locked against rotation during such interval and cannot begin a new movement of rotation until the recorder is in condition to receive a new series of impulses. As soon, however, as the operations of printing and resetting the type-wheel are completed, the magnet 114 becomes inactive, by the interruption of its circuit, the shaft 7 starts in rotation, because by the depression of a key and the action of magnet 20 the lever 30 has been raised far enough to permit lever 33 to be forced backward when released by the stop 117, and the series of impulses selected by the adjustments effected by the premature depression of a key is sent to line. By this means the operations attendant upon the selection and printing of one character must be fully completed before those required for the printing of another become effective, although the latter if started too quickly, are stored, as it were, by the action of magnet 114.

There are certain other features of the instrument which will be more readily understood from a description of the diagram of circuit connections shown in Fig. 12, to which reference will now be made.

It will be understood that an operator in charge of the transmitter should be able to see at a glance just what the recorder is doing in response to the impulses sent by the transmitter, but it is presumable that what one recorder does, all others on the same line or receiving impulses therefrom either directly or through relays, will do. It is therefore customary to employ with a transmitter what is known as a home recorder, placed on the same table with the transmitter, and to relay from the circuit between the transmitter and this home recorder the impulses for operating one or more distant recorders. This arrangement is illustrated in Fig. 12.

As the present invention and application are not concerned with the construction or particular mode of operation of the various elements of the recorder these latter are illustrated only so far as may be necessary to show the relations of the principle elements of the transmitter and recorder to each other and to the circuit or circuits between them. Referring to Fig. 12, therefore, the recording mechanism is illustrated at the top or right hand of the sheet, and the transmitting mechanism on the lower or left hand portion of said sheet. What corresponds to the main circuit over which the operative impulses of current are transmitted to the recorder is designated by 120. This circuit includes the polarized magnet 118 whose function is to turn the type-wheel; the polarized magnet 119 that lifts the type-wheel, and the magnet 123 that controls the local circuit containing the printing magnet 121 and the mechanism which operates the printing magnet by either a prolongation of the interval of no current, or the prolongation of the final impulse or current whether positive or negative. In addition to these instrumentalities the mechanism for controlling a local circuit including a magnet 125, and which is designated by 122, and the function of which is to feed the paper without returning the type-wheel when five positive impulses are transmitted, is represented diagrammatically as is also the mechanism operated by five lifting impulses to return the type-wheel and feed the paper, and which is indicated by 124. It will be observed from the circuit connections illustrated when both of these devices are operated by a series of five positive alternating with five negative impulses a signal light 126 will be operated.

It has been explained above that when the final impulse of a series is prolonged by the operation of the sunflower and one of the relays 83 or 84, the circuit-closing armature of the relay brought into operation is maintained in position to close a by-pass circuit to line by the action of a spring detent 131. In order to retract the armature as soon as the operation of printing has been completed a circuit 128, including retracting magnets 127 and a battery 129, is carried from the transmitter to the home recorder, in which latter a circuit-controller 132 is operated by a cam 133 on the main shaft of the recorder. This cam is so timed that as soon as the printing magnet has operated, the lever of the circuit-controller 132 is permitted to drop and close the circuit through magnets 127 which operate to retract either of the armatures 130 that may have been attracted by its corresponding relay magnet 83 or 84. This leaves the relay in position to effect the prolongation of the final impulse of the next series transmitted to line. It has also been explained that the circuit of the storing magnet 114 is closed during the operations of printing and restoration of the type-wheel to its initial position. This is effected by a circuit 135, including magnet 114, a battery 136, and a circuit-controller 137 operated by a cam 154 on the main shaft of the recorder. This cam is so timed that the circuit 135 will be broken the instant that the printing magnet 121 has completed its operation and the type-wheel restored to its initial position.

Another detail of importance in the operation of the system is a device for positively preventing the operation of the printing magnet during the transmission of the impulses which control the operation of the recorder. This is a precautionary measure which applies to the home recorder in which it is desirable to make the printing magnet somewhat more sensitive than in the distant recorders, in order that the operations of the recorder, which control the operation of all the other recorders should be more certain, but in order that the printing magnet may not be operated until the last impulse of the series has been sent or prolonged there is employed in connection with the character keys a mechanical circuit-breaker that interrupts the local circuit 41, including the printing magnet and the battery 142. This device is a rod 138 pivoted to the right hand lever 60 (Fig. 1) and carrying a stop 143 in the path of the left hand lever 60, and operating when either of said levers 60 are shifted to interrupt the printing magnet circuit 41 by raising a contact lever 139 from its stop 140. By this means while impulses are going to line by the closure of the circuit-controllers 62, or either of them, the circuit of the printing magnet will be interrupted, but as soon as the levers 60 are returned to normal position the printing magnet circuit will be closed. A similar provision for interrupting the circuit of the printing magnet while those keys are depressed which do not operate to shift levers 60, is shown in Figs. 2 and 6. For example the paper-space key 87 in addition to operating the circuit-controller 97 through the rod 95 operates also a circuit-controller 141 by means of a stud 142. When the key 87 is depressed therefore the stud 142 on rod 95 forces down the circuit-controlling lever 141 which operates to interrupt the circuit of the printing magnet during the interval of the depression of the key. In the same way the depression of key 88 which returns the type-wheel carriage and feeds the paper, forces downward a circuit-controller 143 in the printing magnet circuit by the engagement therewith of a stop 144 on the rod 98, operated by said key. Finally the lever 5 of the blanking key, as shown in Figs. 3 and 12, has a metal plate 145 inserted in the insulating plate 104 upon which metal plate bear two contact springs 146 through which the printing magnet circuit is closed, but by the depression of the key 89 the springs 146 are shifted onto insulation and maintain a break in the printing magnet circuit as long as the said key is depressed.

I would state that the construction of the mechanical elements composing the transmitter hereinbefore described may be varied almost indefinitely without departure from the invention, as the improvement resides chiefly in the association or combination of these elements for effecting the operations described, and not in the construction of the elements themselves.

My purpose has been to devise a transmitter which can be operated in the same manner as an ordinary typewriter and by any operator skilled in the use of such instrument, and this object I have accomplished by the utilization of devices which enable the instrument to be operated at high speed, and by means of which all of the necessary operations effected by the electrical impulses are independent of the control of the operator except by the simple depression of the mechanical keys.

What I claim is:

1. In a printing telegraph transmitter, the combination of a series of keys corresponding to characters to be selected and printed, means for connecting the opposite terminals of a source of current alternately to line, circuit controllers intermediate to the respective terminals and the line, and selecting device adapted when actuated by the depression or manipulation of the keys, to limit the intervals of closure of the circuit controllers, according to the number of impulses through either or both, necessary for the selection and printing of the characters corresponding to the keys depressed.

2. In a printing telegraph transmitter, the combination of a series of keys corresponding to characters to be selected and printed, means for connecting the opposite terminals of a source of current alternately and during short periods to line, means for maintaining the paths between the respective terminals and the line closed during intervals sufficient to permit a predetermined number of impulses in either or both directions to pass to line, and means for prolonging the final impulse of any series necessary for the selection and printing of a character, the operation of all of said means being under the control of the keys and adapted to be actuated by their depression or manipulation, as set forth.

3. In a printing telegraph transmitter, the combination of a power driven shaft, a series of character keys each of which, when depressed, releases said shaft and permits it to make one revolution, a commutator operatively connected with the shaft for connecting the opposite terminals of a source of current alternately to line, a circuit controller in each of the paths intermediate to the said terminals and the line, and selecting devices intermediate to the said shaft and circuit controller, adapted to be brought into engagement with the shaft by the operation of the keys and thereby maintain either or both of the circuit controllers closed for intervals dependent upon the number and direction of the impulses necessary for selecting and printing a character corresponding to the key depressed.

4. In a telegraph transmitter, the combination of a series of character keys, a power driven shaft adapted to be released by the operation of each key, locking means limiting the shaft, when so released, to one revolution, a commutator driven by the shaft for connecting the opposite terminals of a source of current alternately to line, circuit controllers in paths intermediate to the respective terminals and the line, selecting devices controlled by the keys for maintaining either or both of said circuit controllers closed for predetermined intervals, and means for completing a path around either of the circuit controllers from a terminal of the source of current to line, for prolonging either the positive or negative final impulse sent to line through the said controllers by the commutator, as set forth.

5. In a telegraph transmitter, the combination of a group of selecting devices, each of which is adapted to effect the transmission of a predetermined number of short positive impulses, a group of similar devices each of which is adapted to effect the transmission of corresponding negative impulses, a bank of keys, mechanical connections between the same and the selecting devices for setting or adjusting for operation one of either or of both of the groups of the same, circuit controlling devices operated by certain of the keys to prolong the final positive impulse of current of any series transmitted, circuit controlling devices operated by certain other keys for prolonging the final negative impulse of any series, and circuit controlling devices operated by the remaining keys to prevent the prolongation of final impulses in either direction, as set forth.

6. In a printing telegraph transmitter, the combination of a power driven shaft, a commutator for connecting the opposite terminals of a source of current alternately to line, a circuit controller intermediate to each of said terminals and the line and normally interrupting the paths respectively by which the alternate impulses flow to line, selecting devices, by the adjustment of which either or both of said circuit controllers are caused to close, for predetermined intervals, the paths controlled thereby, and a spacing key adapted while depressed to permit the shaft to rotate freely, and to engage with and bring into action that selecting device which permits, by the interval of closure of one of the circuit controllers, one impulse of definite direction to flow to line for each revolution of the shaft, as set forth.

7. In a printing telegraph transmitter, the combination of a normally locked power driven shaft, a commutator in gear therewith for connecting, while in rotation, the opposite terminals of a source of current alternately to line, circuit controllers intermediate to the respective terminals and the line, selecting devices by the adjustment or operation of which the circuit controllers or either of them is closed for predetermined intervals to permit a given number of impulses to pass to line, and working keys adapted while depressed to permit free rotation of the shaft and to close a path from either or both terminals of the source of current to line, whereby impulses in either, or both directions alternately, may be transmitted continuously by the operation of said keys, as and for the purpose set forth.

8. In a telegraph transmitter, the combination of a normally locked power driven shaft, a commutator in gear therewith and adapted while in rotation to connect the opposite terminals of a source of current alternately with two normally open paths to line, circuit controllers in each of said paths and keys for releasing the shaft and closing either or both of the circuit controllers for intervals varying according to the number of impulses in either or both directions required for the selection and printing of the characters corresponding to the key depressed.

9. In a printing telegraph transmitter, the combination with a selecting device which when actuated effects the transmission of a given series of short current impulses to line, two keys corresponding to different characters to be selected and printed both engaging with and adapted to actuate the said selecting device, and circuit controllers engaging with and operated by the two keys respectively for effecting or preventing the prolongation of the final impulse, as set forth.

10. In a printing telegraph transmitter, the combination of a series of selecting devices by the operation or adjustment of which the series of impulses are sent to line for the selection and printing of the characters desired, means for locking the selecting devices in position when adjusted, and a controlling magnet for preventing the operation of the adjusted selecting devices until the operations attendant upon the preceding series of impulses have been completed.

11. In a printing telegraph transmitter, the sub-combination of elements for determining the intervals during which the impulses of any series necessary for selecting and printing a given character are sent to line, comprising a power-driven shaft having a series of cams thereon, two groups of plungers adapted to be moved into engagement with the cams, circuit controllers actuated by the plungers of each group respectively when any one of the said plungers is engaged and deflected by its cam, keys and key levers, and connections between the same and the plungers, as set forth.

12. In a printing telegraph transmitter, the sub-combination of elements for effecting a prolongation of the final impulse of any series transmitted for the selection and printing of a given character, comprising a commutator, a pair of circuit controllers between the commutator and the line, a sunflower disk, a contact brush rotating thereon in synchronism with the commutator, relays controlling local paths from the source of current to line and switches in the circuits of said relays which, operated by the keys, complete said circuits through the sunflower segments and relays during the transmission through the commutator segments of the final impulse of a given series, as set forth.

13. In a printing telegraph transmitter, the sub-combination of elements for effecting the transmission of the impulses necessary for returning the type-wheel from any point in a line, feeding the paper and indicating the completion of a message, comprising a power-driven shaft, a commutator for connecting the opposite terminals of a source of current alternately to line, a special key adapted when depressed to release, and while depressed to permit the free rotation of the shaft, and switches in paths from the respective terminals through the commutator to line, operated by the said key, whereby alternately positive and negative impulses of current will be sent continuously to line by the depression of said key, as set forth.

14. In a printing telegraph transmitter, the sub-combination of elements for determining whether the impulses of any given series transmitted shall be all short or all short but the final impulse, comprising a series of key levers, three rocking bars extending transversely under the same and provided with notches whereby one of said bars only is engaged by each key when depressed, circuit controllers operated by the respective bars, and circuits controlled thereby which are closed from the positive or negative terminal of the source of current to line or are interrupted from both terminals according as the final impulse is to be short or prolonged from the positive or the negative terminals of the source of current.

15. In a printing telegraph transmitter, the sub-combination of elements for storing a series of impulses which the instrument may be prematurely adjusted to transmit, comprising a power-driven intermittently rotated shaft, a storing or controlling magnet and independent locking mechanism controlled thereby, the selecting plungers and locking devices for engaging with and retaining the same when shifted for the selection of a series of impulses, consisting of pivoted levers with hooked or shouldered ends and spring-actuated latches or pawls pivoted thereon, adapted to prevent the reengagement of the plungers when released from the said levers, until said plungers have reached the limit of their return movement, as set forth.

16. In a printing telegraph transmitter, the sub-combination of elements for effecting the transmission of the impulses of a series necessary for the selection and printing of any given character, comprising a power-driven shaft having a series of cams thereon, a series of key levers, two groups of selecting plungers connected with and adapted to be shifted into engagement with the said cams by the keys, plates supporting the plungers of each group and adapted to be shifted by the engagement of any plunger of a group with its corresponding cam, and circuit controllers operatively connected with the respective plates, as set forth.

In testimony whereof I affix my signature in the presence of two subscribing witnesses.

JOHN E. WRIGHT.

Witnesses:
 M. LAWSON DYER,
 S. S. DUNHAM.

---

Copies of this patent may be obtained for five cents each, by addressing the "Commissioner of Patents, Washington, D. C."